(12) United States Patent
Inoue et al.

(10) Patent No.: US 9,416,873 B2
(45) Date of Patent: Aug. 16, 2016

(54) CONTINUOUSLY VARIABLE TRANSMISSION AND CONTROL METHOD THEREFOR

(71) Applicants: JATCO LTD, Fuji-shi, Shizuoka (JP); NISSAN MOTOR CO., LTD., Yokohama-shi, Kanagawa (JP)

(72) Inventors: Mamiko Inoue, Ebina (JP); Hiroyasu Tanaka, Atsugi (JP); Takuichiro Inoue, Fujisawa (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/430,107

(22) PCT Filed: Sep. 3, 2013

(86) PCT No.: PCT/JP2013/073649
§ 371 (c)(1),
(2) Date: Mar. 20, 2015

(87) PCT Pub. No.: WO2014/050454
PCT Pub. Date: Apr. 3, 2014

(65) Prior Publication Data
US 2015/0247573 A1    Sep. 3, 2015

(30) Foreign Application Priority Data

Sep. 27, 2012    (JP) .................. 2012-213943

(51) Int. Cl.
*G06F 17/00*    (2006.01)
*F16H 61/662*    (2006.01)
*F16H 61/70*    (2006.01)
*F16H 61/04*    (2006.01)
*F16H 59/38*    (2006.01)
*F16H 37/02*    (2006.01)

(52) U.S. Cl.
CPC .......... *F16H 61/66259* (2013.01); *F16H 61/04* (2013.01); *F16H 61/702* (2013.01); *F16H 59/38* (2013.01); *F16H 2037/023* (2013.01); *F16H 2061/66218* (2013.01)

(58) Field of Classification Search
None
See application file for complete search history.

(56) References Cited

U.S. PATENT DOCUMENTS

| 6,052,639 | A  | * | 4/2000 | Ashizawa | ......... F16H 61/66254 477/43 |
| 8,585,544 | B2 | * | 11/2013 | Honda | .................. B60W 10/02 477/37 |
| 8,666,616 | B2 | * | 3/2014 | Tanaka | .................. F16H 61/702 192/31 |
| 2010/0191430 | A1 | | 7/2010 | Kobayashi et al. | |

(Continued)

FOREIGN PATENT DOCUMENTS

| JP | 05-079554 A | 3/1993 |
| JP | 2009-041626 A | 2/2009 |

(Continued)

*Primary Examiner* — Dirk Wright
(74) *Attorney, Agent, or Firm* — Foley & Lardner LLP (57) ABSTRACT

A transmission controller determines whether or not an input rotation speed of a sub-transmission mechanism is stagnant and executes a feedback control by adding a rotation speed change rate feedback correction amount caused by a difference between a target input rotation speed change rate and an actual input rotation speed change rate of the sub-transmission mechanism to a rotation speed feedback correction amount if the input rotation speed is determined to be stagnant.

4 Claims, 6 Drawing Sheets

(56) References Cited

U.S. PATENT DOCUMENTS

2010/0227736 A1 9/2010 Takahashi et al.
2012/0059557 A1 3/2012 Tanaka et al.

FOREIGN PATENT DOCUMENTS

| JP | 2010-209946 A | 9/2010 |
| JP | 2012-057697 A | 3/2012 |

* cited by examiner

CONTINUOUSLY VARIABLE TRANSMISSION AND CONTROL METHOD THEREFOR

TECHNICAL FIELD

The present invention relates to a control of a continuously variable transmission with a sub-transmission mechanism.

BACKGROUND ART

JP5-79554A discloses a shift mode in which a speed ratio of a variator is changed in a direction opposite to a speed ratio changing direction of a sub-transmission mechanism in changing a gear position of the sub-transmission mechanism in a continuously variable transmission with the variator (continuously variable transmission mechanism) and the sub-transmission mechanism provided in series (hereinafter, referred to as "coordinated shift").

If this coordinated shift is performed, speed changes of an engine and a torque converter in shifting the sub-transmission mechanism become smaller, thereby being able to reduce a shift shock caused by inertia torques of these.

SUMMARY OF INVENTION

In the above coordinated shift, if the variator is shifted in accordance with an inertia phase of the sub-transmission mechanism and an actual speed ratio of the sub-transmission mechanism is continuously changed in accordance with a speed ratio change of the variator, an overall speed ratio change becomes smaller and the above shift shock can be further suppressed.

To change the actual speed ratio of the sub-transmission mechanism in this way, a capacity of a release-side frictional engagement element or engage-side frictional engagement element of the sub-transmission mechanism may be corrected according to a deviation between a target input rotation speed and an actual input rotation speed so that an input rotation speed of the sub-transmission mechanism reaches a target rotation speed set according to the speed ratio change of the variator (rotation speed feedback control).

However, in such a rotation speed feedback control, the input rotation speed of the sub-transmission mechanism does not increase quickly and the shift may be delayed if the shift of the sub-transmission mechanism in the coordinated shift is a so-called power-on downshift in response to the depression of an accelerator pedal.

This is for the following reason. Although the input rotation speed of the sub-transmission mechanism needs to be increased in the power-on downshift, a correction amount of the capacity of the frictional engagement element becomes smaller in the above rotation speed feedback control, the release of the release-side frictional engagement element is not promoted and the input rotation speed of the sub-transmission mechanism hardly increases if the actual input rotation speed increases and the deviation between the target input rotation speed and the actual input rotation speed becomes smaller in a situation where an input torque to the sub-transmission mechanism is small. This problem becomes more notable in a high vehicle speed region where a change in the input rotation speed before and after the shift of the sub-transmission mechanism is large.

The present invention aims to reduce a shift delay of a sub-transmission mechanism when a downshift of the sub-transmission mechanism in a coordinated shift is a power-on downshift.

One aspect of the present invention provides a continuously variable transmission with a variator capable of continuously changing a speed ratio and a sub-transmission mechanism connected to an output side of the variator and configured to switch a gear position by changing engaged states of a plurality of frictional engagement elements, and a control method corresponding to this. The continuously variable transmission includes a coordinated shift unit configured to perform a coordinated shift of changing a speed ratio of the variator in a direction opposite to a speed ratio changing direction of the sub-transmission mechanism in shifting the sub-transmission mechanism, a power-on downshift determination unit configured to determine whether or not the shift of the sub-transmission mechanism is a power-on downshift caused by the depression of an accelerator pedal in the case of performing the coordinated shift, a feedback control unit configured to control a capacity of the frictional engagement element of the sub-transmission mechanism to be released according to a rotation speed feedback correction amount caused by a difference between a target input rotation speed and an actual input rotation speed of the sub-transmission mechanism if the shift of the sub-transmission mechanism is determined to be a power-on downshift, a rotation stagnation determination unit configured to determine whether or not an input rotation speed of the sub-transmission mechanism is stagnant, and an addition unit configured to add a rotation speed change rate feedback correction amount caused by a difference between a target input rotation speed change rate and an actual input rotation speed change rate of the sub-transmission mechanism to the rotation speed feedback correction amount when the input rotation speed is determined to be stagnant.

According to the above aspect, if the input rotation speed of the sub-transmission mechanism stagnates when a downshift of the sub-transmission mechanism in the coordinated shift is a power-on downshift, the feedback control is performed by adding the rotation speed change rate feedback correction amount to the rotation speed feedback correction amount. Thus, the shift of the sub-transmission mechanism is promoted and a shift delay of the sub-transmission mechanism can be reduced.

DESCRIPTION OF EMBODIMENT

Hereinafter, an embodiment of the present invention is described with reference to the accompanying drawings. It should be noted that, in the following description, a "speed ratio" of a certain transmission mechanism is a value obtained by dividing an input rotation speed of this transmission mechanism by an output rotation speed thereof. Further, a "lowest speed ratio" is a maximum speed ratio of this transmission mechanism and a "highest speed ratio" is a minimum speed ratio thereof.

Figure 1:
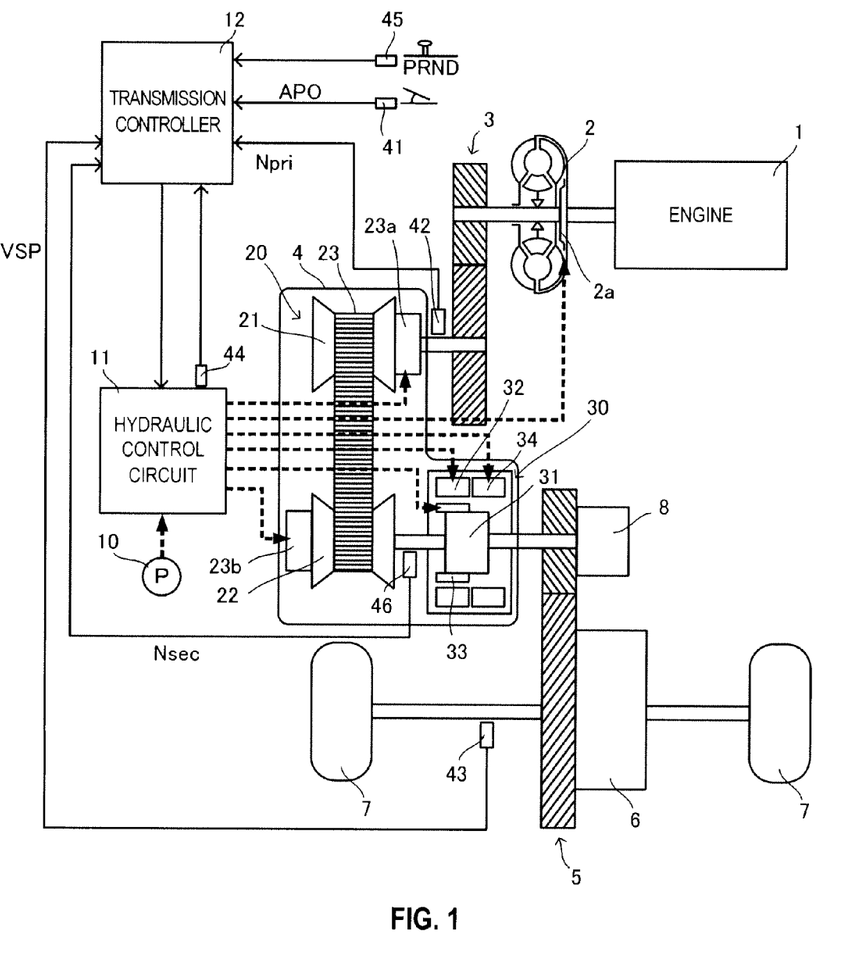
FIG. 1 is a schematic configuration diagram of a vehicle equipped with a continuously variable transmission according to an embodiment of the present invention.

FIG. 1 is a schematic construction diagram of a vehicle equipped with a continuously variable transmission according to the embodiment of the present invention. This vehicle includes an engine 1 as a drive source. Output rotation of the engine 1 is transmitted to drive wheels 7 via a torque converter 2, a first gear train 3, a transmission 4, a second gear train 5 and a differential device 6. The second gear train 5 includes a parking mechanism 8 for mechanically and unrotatably locking an output shaft of the transmission 4 in a parked state.

The torque converter 2 includes a lock-up clutch 2a. When the lock-up clutch 2a is engaged, there is no slip in the torque converter 2 and transmission efficiency of the torque converter 2 is improved.

The vehicle is provided with an oil pump 10 to be driven using a part of power of the engine 1, a hydraulic control circuit 11 for adjusting a hydraulic pressure from the oil pump 10 and supplying the adjusted hydraulic pressure to each component of the transmission 4 and a transmission controller 12 for controlling the hydraulic control circuit 11.

The transmission 4 includes a variator 20 and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train).

The variator 20 includes a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and hydraulic cylinders 23a, 23b provided on the back surface of this movable conical plate for displacing the movable conical plate in an axial direction. When hydraulic pressures supplied to the hydraulic cylinders 23a, 23b are adjusted, the widths of the V-grooves change to change a contact radius of the V-belt 23 and each pulley 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. By adjusting hydraulic pressures supplied to the frictional engagement elements 32 to 34 to change engaged states of the frictional engagement elements 32 to 34, a gear position of the sub-transmission mechanism 30 is changed.

Specifically, the sub-transmission mechanism 30 is set to a first gear position if the low brake 32 is engaged and the high clutch 33 and the reverse brake 34 are released. The transmission mechanism 30 is set to a second gear position with a speed ratio lower than in the first gear position if the high clutch 33 is engaged and the low brake 32 and the reverse brake 34 are released. Further, the sub-transmission mechanism 30 is set to a reverse gear position if the reverse brake 34 is engaged and the low brake 32 and the high clutch 33 are released. It should be noted that, in the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

A torque transmittable by the frictional engagement element engaged in each gear position (hereinafter, referred to as a "capacity") is determined by the hydraulic pressure supplied from the hydraulic control circuit 11 to each frictional engagement element 32 to 34.

Figure 2:
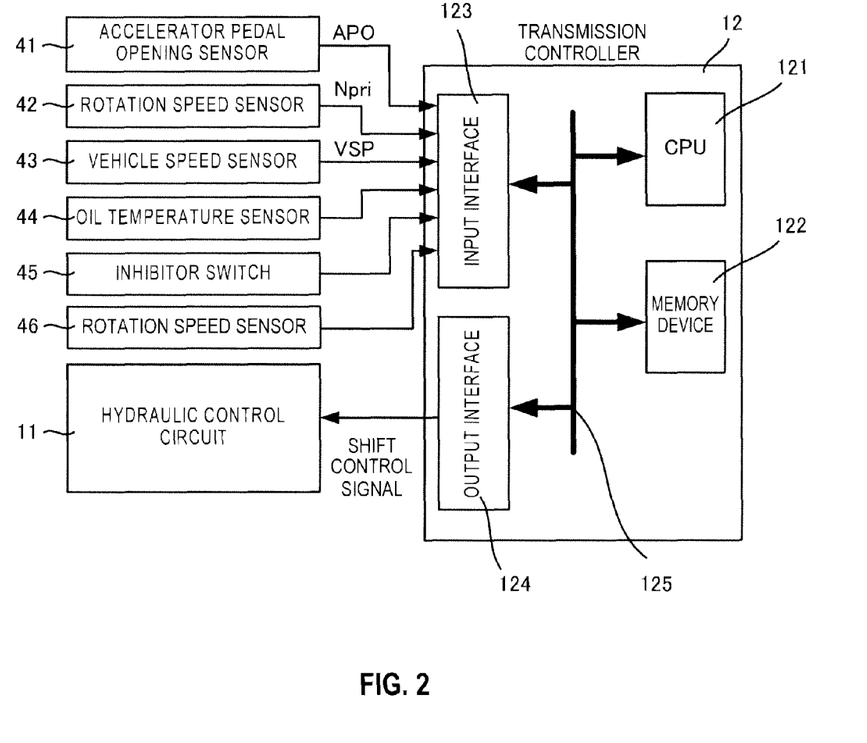
FIG. 2 is a diagram showing the internal configuration of a transmission controller.

The transmission controller 12 is, as shown in FIG. 2, configured by a CPU 121, a memory device 122 composed of a RAM and a ROM, an input interface 123, an output interface 124 and a bus 125 which connects these components to each other.

To the input interface 123 are input an output signal of an accelerator pedal opening sensor 41 for detecting an accelerator pedal opening APO indicating an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a vehicle speed VSP, an output signal of an oil temperature sensor 44 for detecting an oil temperature TMP of the transmission 4, an output signal of an inhibitor switch 45 for detecting the position of a select lever, an output signal of a rotation speed sensor 46 for detecting a rotation speed of the secondary pulley 22 (=input rotation speed of the sub-transmission mechanism 30) and the like.

A shift control program (FIG. 6) of the transmission 4 and a shift map (FIG. 3) used in this shift control program are stored in the memory device 122. The CPU 121 reads and executes the shift control program stored in the memory device 122, performs various computations on various signals input via the input interface 123 to generate a shift control signal, and outputs the generated shift control signal to the hydraulic control circuit 11 via the output interface 124. Various values used in the computations by the CPU 121 and computation results thereof are appropriately stored in the memory device 122.

The hydraulic control circuit 11 is composed of a plurality of flow passages and a plurality of hydraulic control valves. In accordance with the shift control signal from the transmission controller 12, the hydraulic control circuit 11 controls the plurality of hydraulic control valves to switch supply paths of the hydraulic pressure, prepares a necessary hydraulic pressure from a hydraulic pressure produced by the oil pump 10 and supplies this to each component of the transmission 4. In this way, the speed ratio of the variator 20 and the gear position of the sub-transmission mechanism 30 are changed, the capacity of each frictional engagement element 32 to 34 is controlled and the lock-up clutch 2a is engaged and released.

Figure 3:
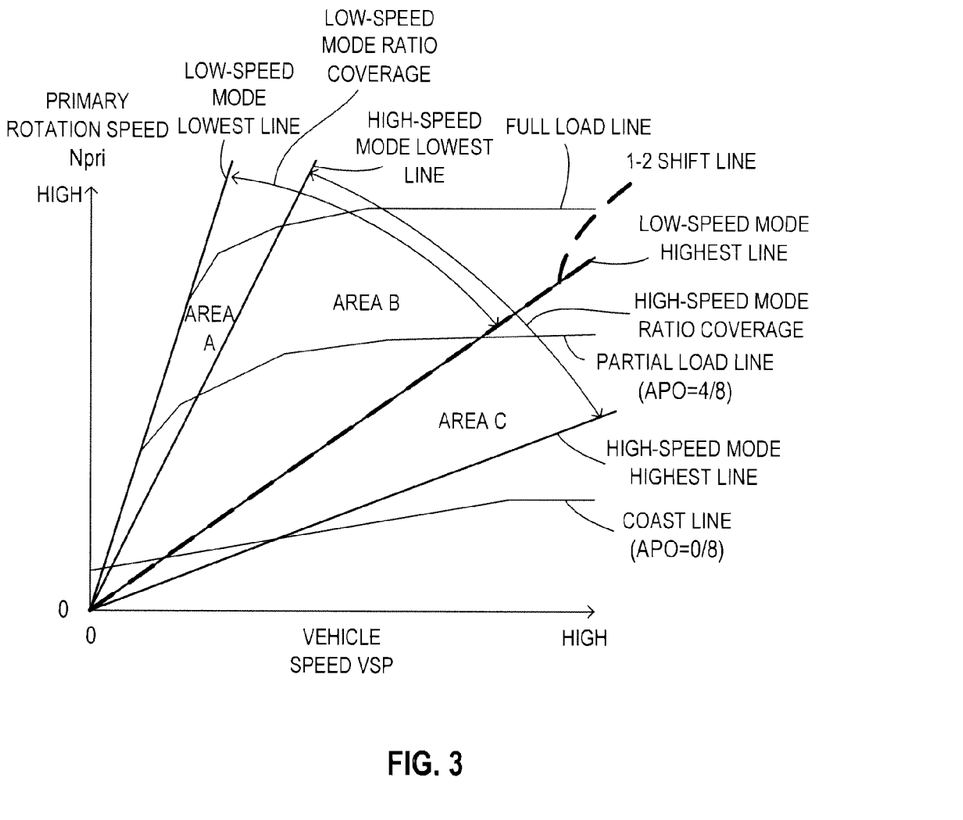
FIG. 3 is a shift map.

FIG. 3 shows the shift map stored in the memory device 122. The transmission controller 12 controls the variator 20, the sub-transmission mechanism 30 and the lock-up clutch 2a according to operating conditions of the vehicle (in this embodiment, vehicle speed VSP, primary rotation speed Npri, accelerator pedal opening APO) while referring to this shift map.

In this shift map, an operating point of the transmission 4 is defined by the vehicle speed VSP and the primary rotation speed Npri. The inclination of a line connecting the operating point of the transmission 4 and a zero point at the lower left corner of the shift map corresponds to the speed ratio of the transmission 4 (overall speed ratio obtained by multiplying the speed ratio of the variator 20 by a speed ratio of the sub-transmission mechanism 30, hereinafter, referred to as a "through speed ratio"). In the shift map, a shift line is set for each accelerator pedal opening APO similarly to a shift map of a conventional belt-type continuously variable transmission, and the transmission 4 is shifted in accordance with the shift line selected according to the accelerator pedal opening APO.

When being in the low-speed mode, the transmission 4 can be shifted between a low-speed mode lowest line obtained by setting the speed ratio of the variator 20 to the lowest speed ratio and a low-speed mode highest line obtained by setting the speed ratio of the variator 20 to the highest speed ratio (areas A and B in FIG. 3). On the other hand, when being in the high-speed mode, the transmission 4 can be shifted between a high-speed mode lowest line obtained by setting the speed ratio of the variator 20 to the lowest speed ratio and a high-speed mode highest line obtained by setting the speed ratio of the variator 20 to the highest speed ratio (areas B and C in FIG. 3).

Further, on this shift map, a mode switch line for switching a mode of the transmission 4 is set so as to overlap the low-speed mode highest line.

If the operating point of the transmission 4 crosses the mode switch line from the area B side to the area C side, the transmission controller 12 upshifts the sub-transmission mechanism 30 from the first gear position to the second gear position. Conversely, if the operating point of the transmission 4 crosses the mode switch line from the area C side to the area B side, the transmission controller 12 downshifts the sub-transmission mechanism 30 from the second gear position to the first gear position.

It should be noted that a setting method for the mode switch line shown in FIG. 3 is an example and it is also possible to set different switch lines for upshifts and downshifts. Further, to suppress a shift frequency, the downshift of the sub-transmission mechanism 30 may be permitted only when a required drive force becomes larger.

Furthermore, the transmission controller 12 performs a coordinated shift of changing the speed ratio of the variator 20 in a direction opposite to a changing direction of the speed ratio of the sub-transmission mechanism 30 in shifting the sub-transmission mechanism 30. Specifically, the transmission controller 12 continuously changes the input rotation speed of the sub-transmission mechanism 30 (corresponding to an actual speed ratio of the sub-transmission mechanism 30) in accordance with a speed ratio change of the variator 20 by shifting the variator 20 in accordance with an inertia phase of the sub-transmission mechanism 30 and controlling the capacity of the engage-side frictional engagement element or release-side frictional engagement element (low brake 32 or high clutch 33) of the sub-transmission mechanism 30 during the inertia phase. In this way, a step difference in an actual through speed ratio Ratio is prevented during the coordinated shift.

To change the input rotation speed of the sub-transmission mechanism 30 in this way, a target input rotation speed matching the speed ratio change of the variator 20 may be set, the capacity of the engage-side frictional engagement element or release-side frictional engagement element may be corrected according to a deviation between the target input rotation speed and an actual input rotation speed, and a rotation speed feedback of causing the actual input rotation speed to approach the target input rotation speed may be performed.

However, in the case of controlling the input rotation speed of the sub-transmission mechanism 30 only by the rotation speed feedback, the input rotation speed of the sub-transmission mechanism 30 does not increase quickly and the shift may be delayed as described in the Summary of Invention if the shift of the sub-transmission mechanism 30 in the coordinated shift is a power-on downshift in response to the depression of the accelerator pedal.

Accordingly, the transmission controller 12 prevents the above shift delay of the sub-transmission mechanism 30 by executing a rotation speed change rate feedback control in addition to a rotation speed feedback control if necessary as described below if the downshift of the sub-transmission mechanism 30 in the coordinated shift is a power-on downshift.

Figure 4:
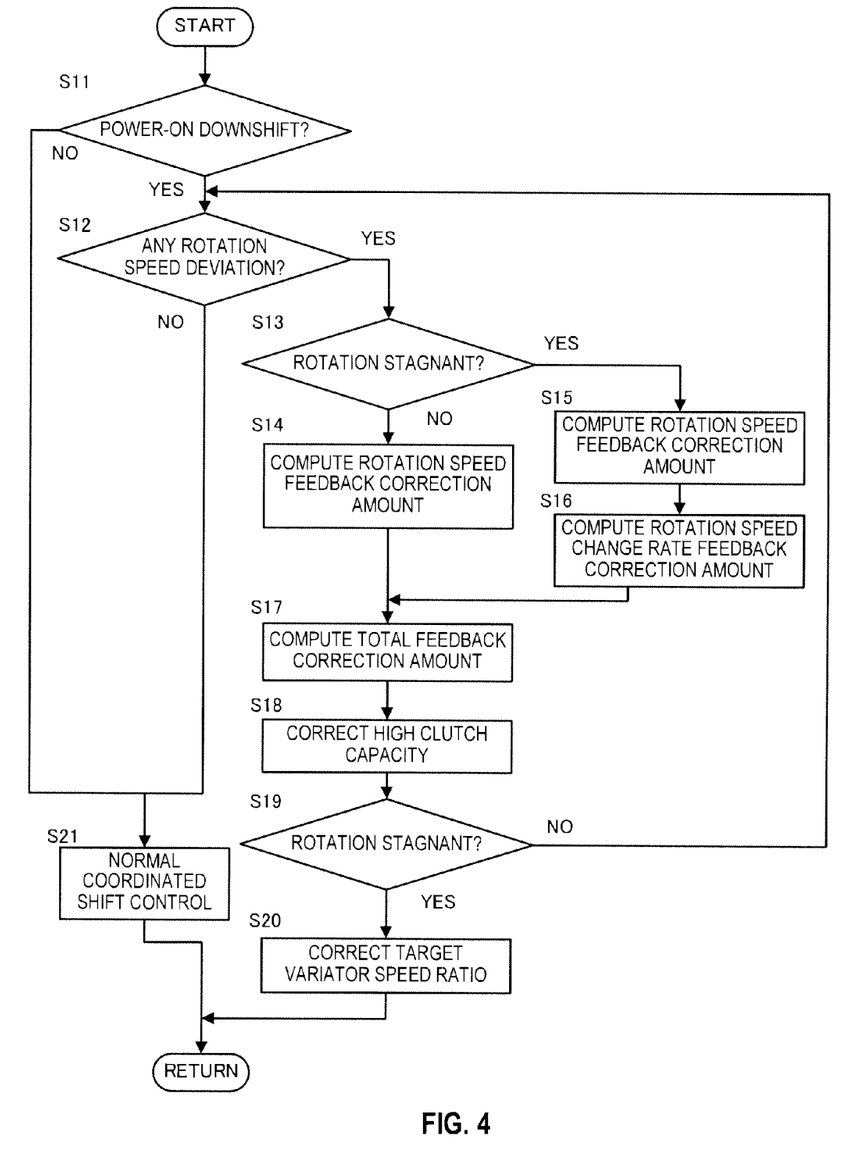
FIG. 4 is a flow chart showing the content of a shift control program to be executed by the transmission controller.

FIG. 4 shows the content of the shift control program in this embodiment stored in the memory device 122 of the transmission controller 12. This shift control program is a program repeatedly executed when the operating point of the transmission 4 crosses the mode switch line and the coordinated shift is performed. This is described below.

In S11, the transmission controller 12 determines whether or not the shift of the sub-transmission mechanism 30 in the coordinated shift is a power-on downshift. If the operating point of the transmission 4 crosses the mode switch line from the area C side to the area B side due to the depression of the accelerator pedal, the shift of the sub-transmission mechanism 30 in the coordinated shift is determined to be a power-on downshift. If the power-on downshift is determined, the process proceeds to S12.

In S12, the transmission controller 12 determines whether or not there is any deviation between the target input rotation speed and the actual input rotation speed of the sub-transmission mechanism 30. The target input rotation speed of the sub-transmission mechanism 30 is so set that the speed ratio of the sub-transmission mechanism 30 continuously changes in accordance with the speed ratio change of the variator 20 and, for example, so set that the through speed ratio does not change before and after the coordinated shift. If any deviation is determined, the process proceeds to S13.

It should be noted that if a negative determination is made in S11, S12, the process proceeds to S21 and a normal coordinated shift control (e.g. conventionally known coordinated shift control disclosed in JP5-79554A) is executed.

In S13, the transmission controller 12 determines whether or not the rotation of the sub-transmission mechanism 30 is stagnant. Specifically, an actual input rotation speed change rate, which is a time rate of change of the actual input rotation speed of the sub-transmission mechanism 30, is computed and it is determined whether or not the actual input rotation speed change rate is smaller than a stagnation determining threshold value. The stagnation determining threshold value is a value close to zero and a threshold value for determining that the actual input rotation speed of the sub-transmission mechanism 30 has hardly changed. The process proceeds to S14 if a negative determination is made while proceeding to S15 if an affirmative determination is made.

Figure 5:
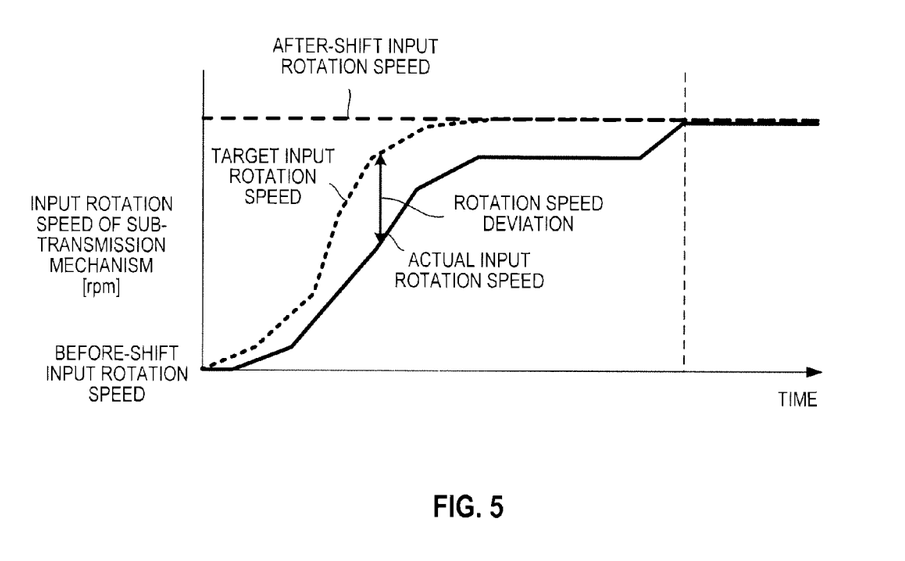
FIG. 5 is a chart showing a rotation speed feedback.

In S14, S15, the transmission controller 12 computes a rotation speed feedback correction amount based on a rotation speed deviation (see FIG. 5) obtained by subtracting the actual input rotation speed from the target input rotation speed of the sub-transmission mechanism 30. A rotation speed feedback correction amount is a positive value if the rotation speed deviation is positive while being a negative value if the rotation speed deviation is negative, and the absolute value thereof increases as that of the rotation speed deviation increases.

Figure 6:
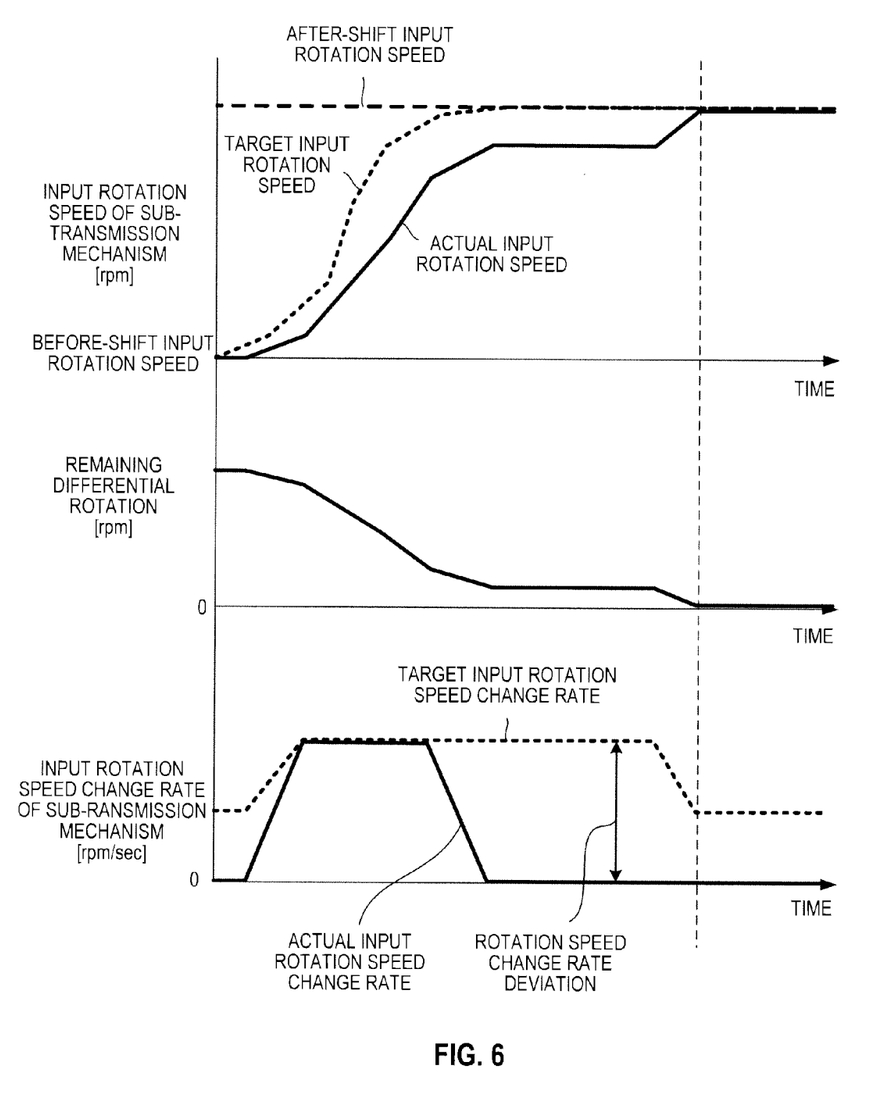
FIG. 6 is a chart showing a rotation speed change rate feedback.

In S16, the transmission controller 12 computes a difference between an after-shift input rotation speed and the actual input rotation speed of the sub-transmission mechanism 30 as remaining differential rotation and sets the target input rotation speed change rate of the sub-transmission mechanism 30 according to a progress degree of the coordinated shift judged from the remaining differential rotation (see FIG. 6). For example, as shown in FIG. 6, the target input rotation speed change rate is set at a small value so that the input rotation speed of the sub-transmission mechanism 30 moderately changes in the initial and final stages of the inertia phase and set at a value larger in the middle stage of the inertia phase than that in the initial and final stages of the inertia phase so that the input rotation speed of the sub-transmission mechanism 30 quickly changes.

The transmission controller 12 computes an actual input rotation speed change rate of the sub-transmission mechanism 30 and computes a rotation speed change rate feedback correction amount based on a rotation speed change rate deviation obtained by subtracting the actual input rotation speed change rate from a target input rotation speed change rate. The rotation speed change rate feedback correction amount is a positive value when the rotation speed change rate deviation is positive while being a negative value when the rotation speed change rate deviation is negative, and the absolute value thereof increases as that of the rotation speed change rate deviation increases.

In S17, the transmission controller 12 computes a total feedback correction amount. The total feedback correction amount is equal to the rotation speed feedback correction amount if the process proceeds from S13 to S14 while being the sum of the rotation speed feedback correction amount and the rotation speed change rate feedback correction amount if the process proceeds from S13 to S15, S16.

In S18, the transmission controller 12 corrects the capacity of the high clutch 33, which is the release-side frictional engagement element in the case of downshifting the sub-transmission mechanism 30, to a value obtained by subtracting the total feedback correction amount from the capacity before the correction. In this way, the capacity of the high clutch 33 is corrected to be smaller.

In S19, the transmission controller 12 determines again whether or not the rotation of the sub-transmission mechanism 30 is stagnant. Specifically, the actual input rotation speed change rate of the sub-transmission mechanism 30 is computed again and it is determined again whether or not the actual input rotation speed change rate is smaller than the predetermined stagnation determining threshold value. The process proceeds to S12 if a negative determination is made while proceeding to S20 if an affirmative determination is made.

In S20, the transmission controller 12 promotes an increase of the input rotation speed of the sub-transmission mechanism 30 by shifting the variator 20 to a high side (to a smaller speed ratio side), whereby the shift of the sub-transmission mechanism 30 is promoted.

Next, functions and effects by the above shift control are described.

In this embodiment, the coordinated shift is performed to change the speed ratio of the variator 20 in the direction opposite to the speed ratio changing direction of the sub-transmission mechanism 30 in changing the gear position of the sub-transmission mechanism 30.

If the input rotation speed of the sub-transmission mechanism 30 is controlled only by the rotation speed feedback control when the shift of the sub-transmission mechanism 30 is a power-on downshift, the rotation of the sub-transmission mechanism 30 stagnates and the shift of the sub-transmission mechanism 30 may be delayed. If the shift is delayed, a drive force intended by a driver cannot be obtained. Further, if the actual input rotation speed of the sub-transmission mechanism 30 is forcibly increased up to the after-shift input rotation speed by engaging the low brake 32, which is the engage-side frictional engagement element, in a state where the shift of the sub-transmission mechanism 30 is not completed, a shock occurs.

However, in this embodiment, the feedback control is executed by adding the rotation speed change rate feedback correction amount to the rotation speed feedback correction amount if such rotation stagnation occurs in this way (S13: YES, S15 to S18). If the rotation stagnation of the sub-transmission mechanism 30 occurs, the input rotation speed change rate of the sub-transmission mechanism becomes smaller and the rotation speed change rate deviation becomes larger. Thus, the capacity of the high clutch 33, which is the release-side frictional engagement elements of the sub-transmission mechanism 30, is corrected to be smaller by this control.

Accordingly, even in a situation where the rotation of the sub-transmission mechanism 30 stagnates if only the rotation speed feedback control is executed, an increase of the input rotation speed of the sub-transmission mechanism 30, i.e. the shift of the sub-transmission mechanism 30 can be promoted and a shift delay of the sub-transmission mechanism 30 can be reduced by quickly reducing the capacity of the high clutch 33.

Further, according to this embodiment, if the rotation stagnation of the sub-transmission mechanism 30 is not solved by the rotation speed change rate feedback control (S19: YES), an increase of the input rotation speed of the sub-transmission mechanism 30 is promoted by shifting the variator 20 to the high side (smaller speed ratio side). In this way, a shift delay of the sub-transmission mechanism 30 can be further prevented.

Although the embodiment of the present invention has been described above, the above embodiment is merely one application example of the present invention and not of the nature to limit the technical scope of the prevent invention to the specific configuration of the above embodiment.

Further, although the power source is the engine 1 in the above embodiment, it may be a combination of the engine 1 and a motor or solely a motor.

The present application claims a priority of Japanese Patent Application No. 2012-213943 filed with the Japan Patent Office on Sep. 27, 2012, all the contents of which are hereby incorporated by reference.

The invention claimed is:

1. A continuously variable transmission with a variator capable of continuously changing a speed ratio and a sub-transmission mechanism connected to an output side of the variator and configured to switch a gear position by changing engaged states of a plurality of frictional engagement elements, comprising:
   a coordinated shift unit configured to perform a coordinated shift of changing a speed ratio of the variator in a direction opposite to a speed ratio changing direction of the sub-transmission mechanism in shifting the sub-transmission mechanism;
   a power-on downshift determination unit configured to determine whether or not the shift of the sub-transmission mechanism is a power-on downshift caused by the depression of an accelerator pedal in the case of performing the coordinated shift;
   a feedback control unit configured to control a capacity of the frictional engagement element of the sub-transmission mechanism to be released according to a rotation speed feedback correction amount caused by a difference between a target input rotation speed and an actual input rotation speed of the sub-transmission mechanism if the shift of the sub-transmission mechanism is determined to be a power-on downshift;

a rotation stagnation determination unit configured to determine whether or not an input rotation speed of the sub-transmission mechanism is stagnant; and an addition unit configured to add a rotation speed change rate feedback correction amount caused by a difference between a target input rotation speed change rate and an actual input rotation speed change rate of the sub-transmission mechanism to the rotation speed feedback correction amount when the input rotation speed is determined to be stagnant.

2. The continuously variable transmission according to claim 1, wherein:

it is determined whether or not the stagnation of the input rotation speed of the sub-transmission mechanism has been solved by the feedback control and the variator is shifted to a smaller speed ratio side if the stagnation is determined not to have been solved.

3. A control method for a continuously variable transmission with a variator capable of continuously changing a speed ratio and a sub-transmission mechanism connected to an output side of the variator and configured to switch a gear position by changing engaged states of a plurality of frictional engagement elements, comprising:

performing a coordinated shift of changing a speed ratio of the variator in a direction opposite to a speed ratio changing direction of the sub-transmission mechanism in shifting the sub-transmission mechanism;

determining whether or not the shift of the sub-transmission mechanism is a power-on downshift caused by the depression of an accelerator pedal in the case of performing the coordinated shift;

controlling a capacity of the frictional engagement element of the sub-transmission mechanism to be released according to a rotation speed feedback correction amount caused by a difference between a target input rotation speed and an actual input rotation speed of the sub-transmission mechanism if the shift of the sub-transmission mechanism is determined to be a power-on downshift;

determining whether or not an input rotation speed of the sub-transmission mechanism is stagnant; and adding a rotation speed change rate feedback correction amount caused by a difference between a target input rotation speed change rate and an actual input rotation speed change rate of the sub-transmission mechanism to the rotation speed feedback correction amount when the input rotation speed is determined to be stagnant.

4. A continuously variable transmission with a variator capable of continuously changing a speed ratio and a sub-transmission mechanism connected to an output side of the variator and configured to switch a gear position by changing engaged states of a plurality of frictional engagement elements, comprising:

coordinated shift means for performing a coordinated shift of changing a speed ratio of the variator in a direction opposite to a speed ratio changing direction of the sub-transmission mechanism in shifting the sub-transmission mechanism;

power-on downshift determination means for determining whether or not the shift of the sub-transmission mechanism is a power-on downshift caused by the depression of an accelerator pedal in the case of performing the coordinated shift;

feedback control means for controlling a capacity of the frictional engagement element of the sub-transmission mechanism to be released according to a rotation speed feedback correction amount caused by a difference between a target input rotation speed and an actual input rotation speed of the sub-transmission mechanism if the shift of the sub-transmission mechanism is determined to be a power-on downshift;

rotation stagnation determination means for determining whether or not an input rotation speed of the sub-transmission mechanism is stagnant; and addition means for adding a rotation speed change rate feedback correction amount caused by a difference between a target input rotation speed change rate and an actual input rotation speed change rate of the sub-transmission mechanism to the rotation speed feedback correction amount when the input rotation speed is determined to be stagnant.

* * * * *